United States Patent [19]
Inada et al.

[11] 3,745,522
[45] July 10, 1973

[54] MONITORING SYSTEMS AND ANTISKID DEVICES OF VEHICLES

[75] Inventors: Masami Inada, Aichi-ken, Kariya-shi; Akiyoshi Hirai; Hiroshi Arai, both of Aichi-ken, Toyota-shi, all of Japan

[73] Assignees: Aisin Seiki Kabushiki Kaisha; Toyota Jidosha Kogyo Kabushiki Kaisha, Aichi-ken, Japan; part interest to each

[22] Filed: Oct. 16, 1970

[21] Appl. No.: 81,415

[30] Foreign Application Priority Data
Oct. 18, 1969 Japan.................... 44/83409

[52] U.S. Cl.................... 340/52 R, 303/21 AF
[51] Int. Cl.................... B60q 1/00, B60t 8/08
[58] Field of Search.................... 303/21 AF, 20; 180/103; 340/52 R

[56] References Cited
UNITED STATES PATENTS
3,516,715  6/1970  Fielek, Jr. et al............... 303/21 AF
3,602,554  8/1971  Ichimura et al................. 303/20
3,275,384  9/1966  Hirzel........................... 303/20

Primary Examiner—John W. Caldwell
Assistant Examiner—Glen R. Swann, III
Attorney—Holman & Stern

[57] ABSTRACT

An antiskid device for a motor vehicle uses a cut-off valve provided with a switching element which, when the cutoff valve operates to isolate a master cylinder of the vehicle braking system from the wheel cylinders, is closed to supply voltage to a reference diode having a predetermined breakdown voltage. This breakdown voltage is reached only when the switching element is kept closed for a duration longer than a normal time interval at which the cutoff valve means operates. Prolonged operating periods of the cutoff valve means may expediently be exhibited by a pilot lamp. Another embodiment of the invention uses a sensing element and a control circuit and an associated monitoring signal generator capable of producing a monitoring signal of the same characteristics as the signal produced by the sensing element in the event of rapid deceleration of the vehicle wheels. The overall operation of the arrangement and circuit of the antiskid device can be checked while the vehicle is at rest.

8 Claims, 8 Drawing Figures

MONITORING SYSTEMS AND ANTISKID DEVICES OF VEHICLES

BACKGROUND OF THE INVENTION

This invention relates to monitoring systems for antiskid devices of vehicles, and more particularly to monitoring systems in which means are provided for detecting and indicating an abnormally long operating period of the pressure regulating means of the vehicle antiskid devices. The monitoring systems of the invention also include a monitoring signal generator whereby the operation of the vehicle antiskid device can be checked while the vehicle itself is at rest.

The rapid braking of a vehicle running on a road which offers comparatively little frictional resistance against the wheels of the vehicle is likely to result in wheel locking, followed by loss of steering power and uncontrolled skidding of the vehicle. In order to forestall these dangerous outcomes, there have been proposed varieties of antiskid devices to be built into the braking systems of vehicles. A typical example of such antiskid devices comprises a sensing device responsive to change in the motion of a vehicle wheel or wheels, a control circuit capable of discriminating the signal supplied from the sensing device to ascertain the impending or actual locking of that wheel or wheels or to ascertain change in the rate of slipping of the wheel or wheels on the road, and a pressure regulator for controlling the braking pressure on the wheel or wheels in accordance with the signal supplied from the control circuit.

The pressure regulator referred to above isolates the master cylinder or other pressurizing device of the vehicle braking system from the wheel cylinder or cylinders when the vehicle wheels are going to lock or have locked or when they slip on the road at a rate exceeding a predetermined maximum. Thereafter the pressure regulator so operates as to reduce the braking pressure supplied to the wheel cylinder or cylinders and thus to regain the proper rotation of the wheels. Due to possible troubles or malfunctions of the various components of the antiskid device, however, the pressure regulator may keep the master cylinder or other pressure producing device isolated from the wheel cylinder or cylinders for unduly extended periods of time, because of which the wheel cylinder or cylinders would be rendered incapable of braking the wheel or wheels.

The antiskid devices proposed heretofore can thus be unreliable and dangerously two-edged in their nature, if, as in the past, they are not equipped with the monitoring systems in accordance with the present invention.

SUMMARY OF THE INVENTION

It is accordingly a primary object of the present invention to provide a novel monitoring system for a vehicle antiskid device whereby the abnormally prolonged isolation of the master cylinder or other pressurizing source of the vehicle braking system from wheel cylinders by a pressure regulating means of the antiskid device is quickly detected and indicated to the vehicle driver.

Another object of the invention is to provide a novel monitoring system for a vehicle antiskid device whereby the normal operating condition of the antiskid device is indicated to the vehicle driver through a simple operation prior to the vehicle run.

Still another object of the invention is to provide novel monitoring systems for vehicle antiskid devices which make utmost use of the usual components of a vehicle braking system and its antiskid device, so that the monitoring systems can be easily built into and incorporated in the vehicles of prior design.

With these and other objects in view, the invention will now be described in detail with reference to the accompanying drawings showing preferred embodiments thereof.

DESCRIPTION OF THE PREFERRED EMBODIMENTS

Figure 1:
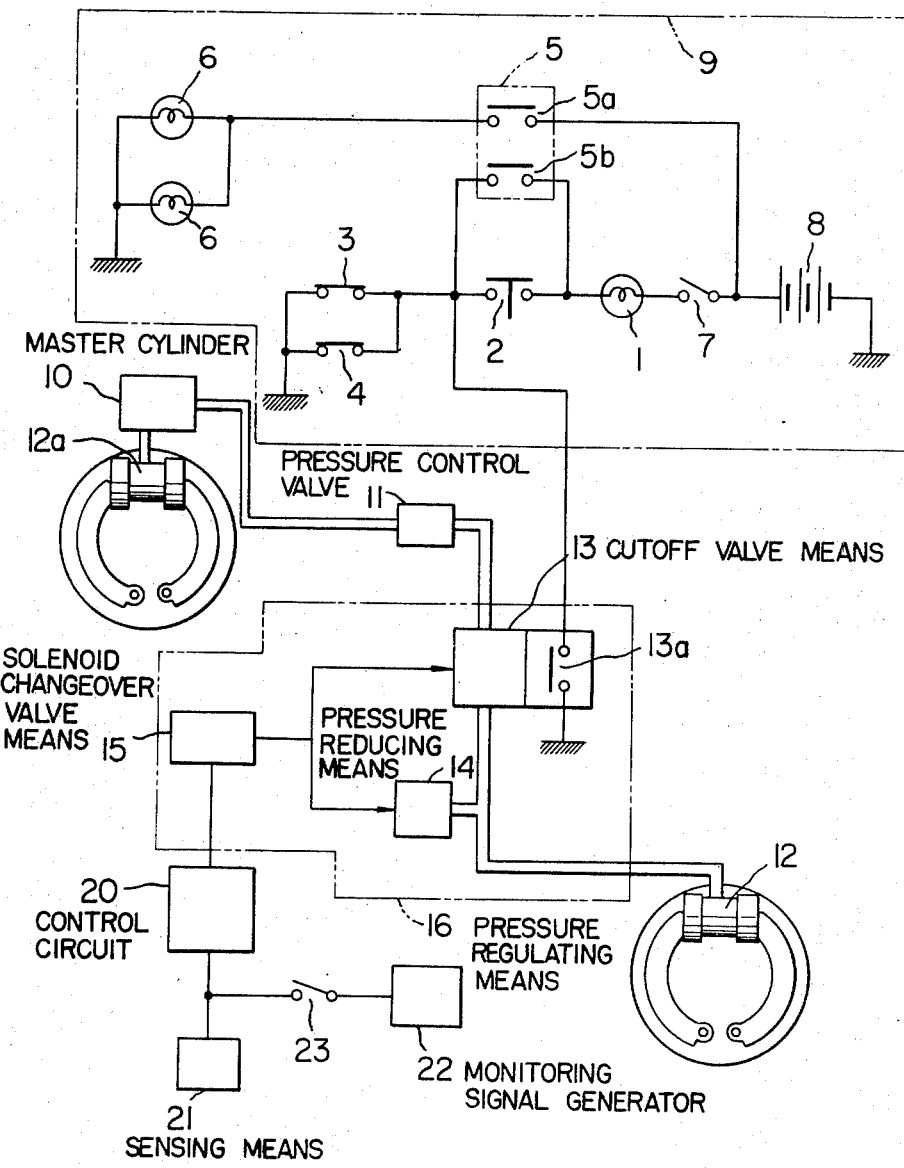
FIG. 1 is a schematic diagram showing, by way of example, the arrangement of a monitoring system of the invention in combination with a vehicle braking system together with its alarm circuit and antiskid device, the monitoring system here being used for the purpose of checking the operating condition of the antiskid device.

Referring now to the drawings, the monitoring system of FIG. 1 is capable of indicating the presence or absence of a trouble or malfunction in the antiskid device according to whether the pilot lamp 1 lights or does not, the monitoring system being thus capable of being used for the purpose of checking the operating condition of the antiskid device whenever desired. Further in FIG. 1, the reference numeral 2 indicates a normally open switch interlocked with a hand brake lever so as to be closed only while the hand brakes are in action. Normally closed switches 3 and 4 are adapted to be opened when the normal braking pressure has built up in the wheels of the vehicle (this condition will occur when, with a liquid pressure braking system, a brake pedal is depressed to a predetermined degree). The reference numeral 5 indicates a normally open switching element interlocked with the brake pedal, the switch means consisting of a contact pair 5a arranged to be closed when the brake pedal is depressed to a certain predetermined degree and another contact pair 5b to be closed when the same brake pedal is depressed to another predetermined degree slightly greater than the first mentioned predetermined degree. A pair of pilot lamps 6 are adapted to indicate the application of braking pressure to vehicles running behind. A normally open switch 7 is to be closed upon closure of an engine switch (not shown). Added with a battery 8, all the aforementioned elements with reference numerals 1 through 7 form part of the alarm circuit 9 for the braking system of the present invention.

A master cylinder 10, a pressure control valve 11, a rear wheel cylinder 12 and a front wheel cylinder 12a are all components of the a conventional braking system. A pressure regulating means 16, one of the components of the antiskid device of the present invention, is interposed in a conduit system between the pressure control valve 11 and the rear wheel cylinder 12. This pressure regulating means 16 comprises a cutoff valve means 13 for shutting off the liquid pressure exerted by the master cylinder 10 whenever necessary, a normally open switch 13a interlocked with the cutoff valve means 13, a pressure reducing means 14 for reducing whenever necessary the liquid pressure supplied to the rear wheel cylinder 12, and a solenoid changeover valve means 15 for operating both the cutoff valve means 13 and the pressure reducing means 14. The mentioned switch 13a is comprised of a contact pair 92 and 94 of the cutoff valve means 13 illustrated in detail in FIG. 5.

A sensing means 21, responsive to change in the motion of the wheels of the vehicle, supplies a signal in response to and representative of said change, to a control circuit 20. Discriminating the signal thus supplied by the sensing means 21, the control circuit 20 ascertains a condition where the wheels of the vehicle are going to lock or have locked or where the wheels slip on the road at a rate exceeding a safe predetermined maximum. Thereupon the control circuit 20 supplies an actuating signal to the solenoid changeover valve means 15.

A monitoring signal generator 22 is capable of generating a signal of the same characteristics as the signal produced by the sensing means 21 upon rapid deceleration of the vehicle wheels. This monitoring signal generator is provided with a normally open switch 23 which, when closed, supplies its monitoring signal to the control circuit 20, so that the proper functioning of the control circuit 20 can be monitored even without the actual braking of the vehicle.

Figure 4:
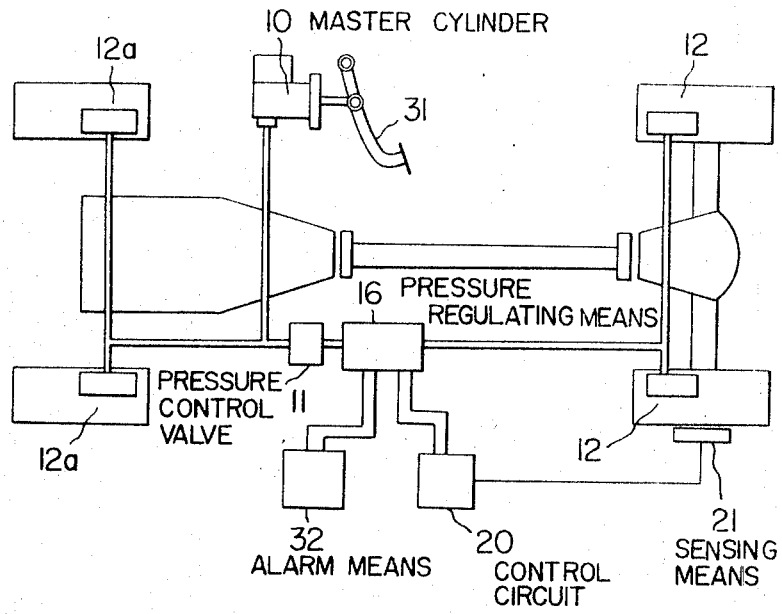
FIG. 4 is a schematic diagram of a braking system including a monitoring system of the invention used for the purpose of detecting and indicating trouble in the pressure regulating means of an antiskid device.

FIG. 4 diagrammatically illustrates a braking system including an alarm means embodying the monitoring system of the invention, the alarm means being capable of inspecting the operation of the antiskid device and announcing the presence or absence of its impending trouble or malfunction to the driver of the vehicle. In this braking system, the pressure that has built up in a master cylinder 10 upon depression of a brake pedal 31 is fed directly to front wheel cylinders 12a and, through a pressure control valve 11 and a pressure regulating means 16, to rear wheel cylinders 12. An alarm means 32, capable of inspecting the operating condition of the antiskid device as above, is electroconductively connected to the pressure regulating means 16. The reference numerals 20 and 21 indicate a control circuit and a sensing means, respectively, as in FIG. 1.

Figure 5:
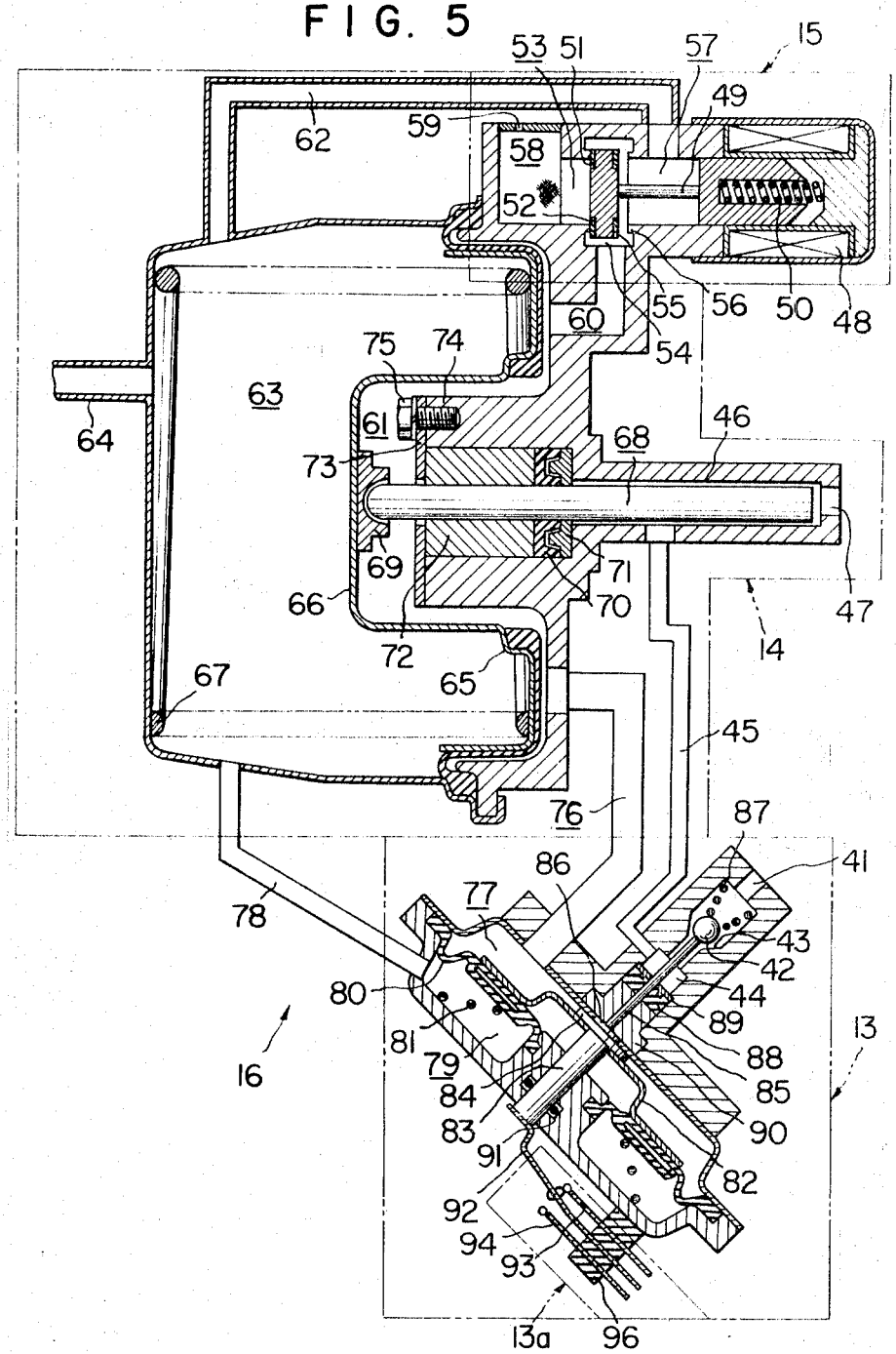
FIG. 5 is an enlarged vertical sectional detail view of the pressure regulating means of the antiskid device of the invention, used for the explanation of the monitoring systems of the invention.

FIG. 5 illustrates in detail the pressure regulating means 16 of FIGS. 1 and 4, on the assumption that the antiskid device is inoperative. The liquid pressure exerted by the master cylinder 10 (not shown in this drawing) enters the cutoff valve means 13 through its inlet opening 41 and passes between a valve ball 42 and a valve seat 43 to enter a chamber 44. Thence the liquid pressure is fed into a pressure reducing chamber 46 of the pressure reducing means 14 through a passage 45, leaving the same through its outlet opening 47 to go into the rear wheel cylinders 12 (in FIG. 4). During the period when the antiskid device is inoperative as in this FIG. 5, the solenoid 48 of the aforesaid solenoid changeover valve means 15 carries no current so that a plunger 49, not electromagnetically attracted thereby, is urged in the left hand direction in the drawing by means of a helical compression spring 50. Consequently, the valve face 51 of the plunger 49 abuts on a valve seat 52, thus disconnecting a chamber 53 from a chamber 54. In this instance, the valve face 55 of the plunger 49 is located off a valve seat 56, so that the chamber 54 is in communication with a chamber 57. The chamber 53 communicates with the atmosphere through an air cleaner 58 and an aperture 59. The chamber 54 communicates with a chamber 61 through a passage 60. The chamber 57 communicates with a chamber 63 through a passage 62. And the chamber 63 communicates with the inlet manifold of the vehicle engine (not shown) through a passage 64 and is subjected to vacuum. The chamber 63 is further separated from the chamber 61 in an airtight manner by means of a diaphragm 65 and a partition 66, the partition 66 being urged in the right hand direction in the drawing by means of spring members 67. A plunger 68 mounted in the pressure reducing chamber 46 is snugly received in a concavity formed in a support 69 secured to the partition 66 and is urged by the aforesaid spring members 67 to such a position that the capacity of the pressure reducing chamber 46 is minimized.

Liquid leakage from the sliding portions of the plunger 68 is prevented by means of a cup 70 kept in position by a retainer 71. A guide 72 for directing the motion of the plunger 68 is kept in position by means of a plate member 73 which is bolted (75) to a housing 74. The chamber 61 communicates with a chamber 77 through a passage 76, and the chamber 63 communicates with a chamber 79 through a passage 78. The mentioned chambers 77 and 79, provided in the cutoff valve means 13, are separated from each other in an airtight manner by means of a diaphragm 80 which is urged upwardly in the right hand direction in FIG. 5 by means of a spring 81 to press a flange 84 of a switch actuating rod 83 through a plate member 82. The flange 84 of this switch actuating rod 83 abuts against a flange 86 of a plunger 85. Thus, ordinarily, the valve ball 42 of the cutoff valve means 13 is subject to the upward pressure of the spring 81 through the diaphragm 80, plate member 82, switch actuating rod 83 and plunger 85, with the result that the valve ball 42 is positioned off the valve seat 43 against the force exerted by a return spring 87.

Liquid leakage from the sliding portions of the plunger 85 is prevented by means of a cup 88 which is kept in position by means of a retainer 89. The motion of the plunger 85 is directed by means of a guide 90. An O-ring 91 is adapted to maintain the vacuum of the chamber 77. A movable contact 92 made of resilient material, to be actuated by means of the switch actuating rod 83, is located in FIG. 5 in contact with a stationary contact 93 and off another stationary contact 94. All these three contacts 92, 93 and 94, forming a switching means to be operated in tune with the motion of the cutoff valve means 13, are secured by means of an insulator 96 for purposes of electrical insulation, and, the aforementioned switch actuating rod 83 also is made of insulating material.

Figure 6:
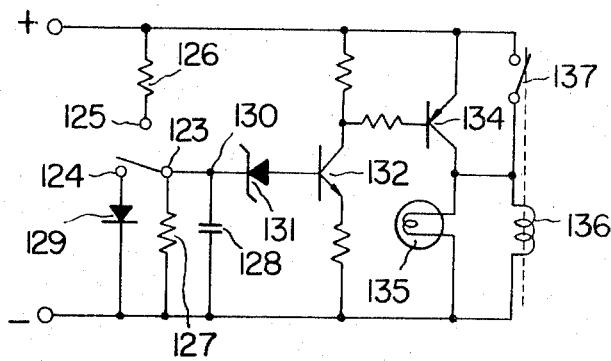
FIG. 6 is a circuit diagram showing the electrical configuration of the monitoring system of FIG. 4.

Referring now to FIG. 6, a circuit diagram for the alarm means of FIG. 4 is diagrammatically illustrated on the assumption also that the antiskid device is inoperative; terminals 123, 124 and 125 correspond to the contacts 92, 93 and 94, respectively, of the switching means of FIG. 5. Upon contact of the terminal 123 with the terminal 125, voltage at an input point 130 of the circuit rises according to a time-constant determined by a resistance-capacitance circuit comprising resistances 127 and 126 and a capacitor 128. When the voltage at this point 130 reaches the breakdown voltage of a reference diode 131, e.g., a zener diode, current flows in the base of a transistor 132. The current flow in this transistor 132 causes another transistor 134 too to carry current, so that a lamp 135 is now lighted. A relay 136 also becomes operative to close a contact pair 137 and maintain it in that closed state, with the result that the lamp 135 is kept lighted even after the voltage at the base terminal of the transistor 132 has extinguished. A diode 129 is interposed in the circuit for the smooth discharge operation of the capacitor 128.

Now, to explain the operations of the monitoring systems of the invention with connection to the braking system of FIG. 4, the solenoid 48 (in FIG. 5) is energized via the control circuit 20 when the wheels of the vehicle are going to lock upon depression of the brake pedal 31. With the solenoid 48 thus energized, the plunger 49 of FIG. 5 moves in the right hand direction in the drawing against the force exerted by the spring 50, bringing the valve face 55 in contact with the valve seat 56 to disconnect the chambers 57 and 54 and separating the valve face 51 from the valve seat 52 to intercommunicate the chambers 53 and 54. As a result, the chamber 77 of the cutoff valve means 13 is supplied with atmospheric air via the aperture 59, air cleaner 58, chamber 53, chamber 54, passage 60, chamber 61 and passage 76, so that the diaphragm 80 presses against the spring 81 due to the atmospheric pressure. By the resultant of the force exerted to the plunger 85 due to the liquid pressure of the master cylinder 10 (in FIGS. 1 and 4) and the force of the spring 87, the plunger 85, switch actuating rod 83, plate member 82, and movable contact 92 are now pressed downwardly in the left hand direction in FIG. 5. The valve ball 42 abuts against the valve seat 43 in order to isolate the master cylinder 10 from the wheel cylinders 12, and the movable contact 92 separates from the contact 93 to engage the contact 94.

Since the atmospheric air is similarly introduced into the chamber 61 of the pressure regulating means 14, the diaphragm 65 presses against the spring 67, thereby relieving the plunger 68 of the force that has been exerted thereon in the right hand direction in FIG. 5 through the partition 66. The plunger 68 is now pressed in the left hand direction in the same drawing due to the liquid pressure exerted thereto by means of the master cylinder 10, thus increasing the capacity of the chamber 46 and reducing the pressure directed into the wheel cylinders 12.

It is assumed that the forces of the springs and the diameters of the diaphragms mentioned in the foregoing two paragraphs are selected in such a manner that the operation of the cutoff valve means 13 always precedes the operation of the pressure reducing means 14 for the purpose of more effective performance of the pressure regulating means 16.

Upon reduction of the liquid pressure directed to the wheel cylinders 12 as above, the wheels of the vehicle decelerate at a reduced rate and will then start accelerating. In accordance with this change in the motion of the vehicle wheels, the control circuit 20 becomes operative to de-energize the solenoid 48. Thereupon the plunger 49 returns to its position given in FIG. 5 due to the force of the spring 50. Since no atmospheric pressure is now exerted on the diaphragms 65 and 80, the plunger 68 is pressed by means of the spring 67 to its former position minimizing the capacity of the chamber 46, while the plunger 85 is pressed by means of the spring 81 to its former position to unseat the valve ball 42 from the valve seat 43 and thus to intercommunicate the master cylinder 10 and the wheel cylinders 12. Simultaneously the movable contact 92 separates from the contact 94 to come in contact with the contact 93.

If, in or immediately following the above process of reincreasing the reduced braking pressure, the liquid pressure supplied to the wheel cylinders rapidly builds up to such an extent as to cause wheel locking again, the same procedure as in the foregoing is reiterated. Hence, supposing that the liquid pressure of the master cylinder is maintained at such a level as to cause wheel locking, the braking pressure applied to the wheel cylinders will be alternately reduced and increased at a substantially constant time interval, provided that the vehicle runs under the same road conditions. As a general rule, this time interval will be longer when the road surface offers but little frictional resistance, and vice versa. In tune with this time interval, the contact 92 (in FIG. 5) comes in alternate contact with the contact 93 and the contact 94. It will accordingly be seen that the terminal 123 (in FIG. 6) makes alternate contact with the terminal 124 and the termianl 125 in synchronism with the operations of the antiskid device. Hence, insofar as the antiskid device is operating at a normal time interval, the rise of the voltage at the point 130, which occurs when the terminal 123 is in contact with the terminal 125, stops before it reaches the breakdown voltage of the reference diode 131, because the terminal 123 makes contact with the terminal 124 earlier than that moment. The lamp 135 will thus never be lighted during the normal operation of the antiskid device.

In the event of trouble or malfunction of the antiskid device, with the result that the braking pressure is kept reduced for a period of time in excess of the normal time interval on the road offering little frictional resistance, the terminal 123 will maintain its contact with the terminal 125 for a correspondingly prolonged period of time. In the meantime, the voltage at the point 130 rises to such an extent as to actuate the reference diode 131, thus causing current to flow through the transistors 132 and 134 and lighting up the lamp 135. The driver of the vehicle is accordingly informed of the presence of an impending possible danger on account of malfunctioning in the antiskid device.

The antiskid device of FIG. 1 operates substantially as explained with reference to FIG. 4, except that its indicator means (i.e. the pilot lamp 1) operates on a different principle. To proceed now to the description of the operation of the braking alarm circuit 9 of FIG. 1, the normally open switch 7 is closed when the engine switch (not shown) is turned on. If the hand brakes are in action at this moment, the switch 2 is closed so that the pilot lamp 1 is lighted, exhibiting that the vehicle will not start unless the hand brakes are disengaged. Upon depression of the brake pedal while the hand brakes are in action, the normally closed switches 3 and 4 open when the normal braking pressure has succeedingly built up. The pilot lamp 1 is not lighted even when the contact pair 5b and the switch 2 are closed, thus indicating the normal condition of the braking system. If the normal braking pressure is not produced, on the other hand, the abnormal condition of the braking system is exhibited by the lighting of the pilot lamp 1 since the switches 3 and 4 are then kept closed. The pair of pilot lamps 6 light up when the brake pedal is depressed, closing the contact pair 5a.

Now, in order to check the operating condition of the antiskid device by means of the monitoring system of the invention, it is necessary that the pilot lamp 1 be kept turned off prior to the checking operation. This can be accomplished by keeping the brake pedal depressed (i.e. by keeping the switches 3 and 4 opened) while the hand brakes are in action (i.e. while the switch 2 is closed). Then, upon closure of the switch 23, the monitoring signal generator 22 supplies its output signal, which for example may be in the form of a rectangular wave as in FIG. 2a, to the control circuit 20. This monitoring signal is capable of reproducing, while the vehicle is at rest, the condition where the vehicle wheels are going to lock or have locked or where the wheels slip on the road at a rate exceeding a predetermined maximum, so that the control circuit 20 supplies an actuating signal to the solenoid changeover valve means 15 in order to operate the cutoff valve means 13 and the pressure reducing means 14. Upon operation of this cutoff valve means 13, the switch 13a interlocked therewith is closed to light up the pilot lamp 1. If the aforementioned monitoring signal is supplied to the control circuit 20 in the form of a periodic wave as in FIG. 2a or 2b, for example, the pilot lamp 1 lights up intermittently in tune with the time interval at which the monitoring signal repeats itself. The vehicle driver thus ascertains regarding the normal operating condition of the antiskid device.

Figure 2A:
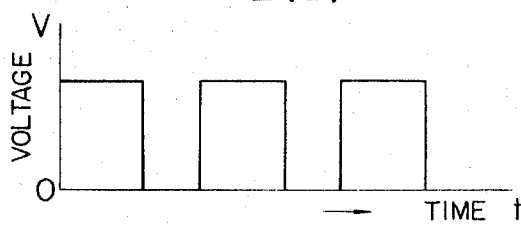
FIGS. 2a and 2b are graphs showing waveforms of examples of monitoring signal to be used for the above purpose.
Figure 2B:
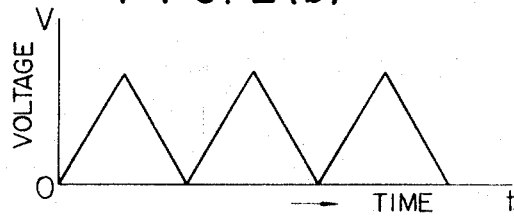
Figure 3A:
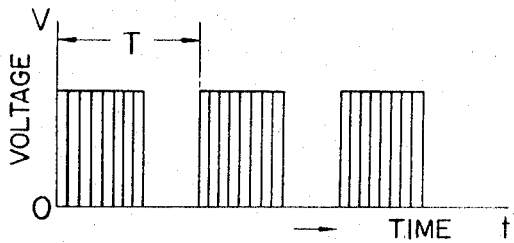
FIGS. 3a and 3b are graphs showing waveforms of other examples of the monitoring signal.
Figure 3B:
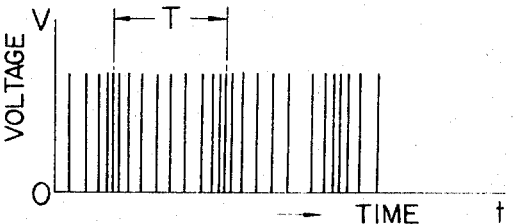

Further, in case the control circuit in use requires an "analog" signal representing the motion of the vehicle wheels, the signal may be supplied in the form of the rectangular wave as in FIG. 2a or a triangular wave as in FIG. 2b. If, on the other hand, the control circuit requires the signal in "digitized" form, for control on the basis of proportionality between the wheel motion and the signal frequency, it may be supplied in the form of frequency modulated waves as in FIGS. 3a and 3b.

Although the invention has been shown and described in the foregoing in connection with several specific embodiments, it will be easy for those skilled in the art to devise many modifications thereof. For instance, the switch 23 of the monitoring signal generator may be not only operated manually but also interlocked with some suitable components. All these modifications or changes are considered to be within the scope of the invention defined by the appended claims.

What is claimed is:

1. An antiskid control system for vehciles, comprising:
    a master cylinder for supplying pressure fluid for brakes of the vehicle;
    a wheel cylinder means for actuating the brake, said wheel cylinder means being connected to receive said pressure fluid;
    a passage means for connecting said master cylinder with said wheel cylinder;
    a sensor for detecting a revolving state of a wheel and for producing a signal of a predetermined shape;
    a controlled circuit means for detecting and signaling a degree of locking because of braking of said wheel, by an output signal sent from said sensor, and for producing an output indicating signal;
    a pressure regulating means connected in said passage means and operated by said indicating signal for regulating fluid pressure from the master cylinder to said wheel cylinder, said pressure regulating means including: a solenoid valve means responsive to and operated by said indicating signal, a cut-off valve means operated by said solenoid valve means and provided for controlling fluid communication between said master cylinder and said wheel cylinder means, a pressure reducing means also operated by said solenoid valve means and provided for reducing the braking fluid-pressure by increasing an effective volume of said passage means, said cut-off valve means including a valve member for cutting off fluid communication between said master cylinder and said wheel cylinder means, and a plunger for bringing said valve member to an open state;
    a switching means working between closed and open positions and operable directly by said cut-off valve means for energizing an indicating circuit;
    and an alarm means provided in said indicating circuit for forwarning an operation-disorder of said valve of said cut-off valve means in response to the operation of said switching means.

2. The antiskid control system for vehicles, as claimed in claim 1, in which said switching means comprises a pair of spaced stationary contacts and a movable contact disposed therebetween and selectively contacting either of said stationary contacts.

3. The antiskid control system for vehicles, as claimed in claim 1, in which said cut-off valve means comprises a rod being actuated in association with said plunger, and wherein, said switching means comprises a movable contact provided on said rod and a stationary contact means provided on the body of said cut-off valve means.

4. The antiskid control system for vehicles, as claimed in claim 1, which further includes a checking means comprising a monitoring signal generator means for supplying a signal having a shape similar to said predetermined shape so as to simulate a substantially locked state of said vehicle wheel so as to test the soundness of operation of the antiskid system when the vehicle is at standstill.

5. The antiskid control system for vehicles, as claimed in claim 1, in which said alarm means comprises a braking alarm circuit, said braking alarm circuit including an indication lamp means responsive to said switching means for indicating that the braking pressure is produced normally, said switching means being responsive to the operation of said plunger in said cut-off valve means and being electrically connected with said indication lamp.

6. The antiskid control system for vehicles, as claimed in claim 5, in which said braking alarm circuit further comprises a second normally-open switching means operating in association with a hand braking lever of the vehicle, a third normally-open switching means operating in association with a brake pedal of the vehicle, and a fourth normally-open switching means operating in association with an engine switch of the vehicle, whereby, in said first position of said switching means, by way of lighting of said indication lamp, there is given an indication as to whether or not normal braking pressure is produced before releasing the hand brake and pressing the brake pedal.

7. The antiskid control system for vehicles, as claimed in claim 1, in which said cut-off valve means comprises two chambers partitioned by a first diaphragm and a rod secured thereto and operated in association with said plunger, and in which said pressure reducing means comprises two chambers partitioned by a second diaphragm and a second plunger attached thereto, for controlling said effective volume in response to the operation of said second diaphragm.

8. The antiskid control system for vehicles, as claimed in claim 1, in which said alarm means comprises: an electrical supply input point; an alarm device; an RC circuit having a known time-constant characteristic connected to said input point so as to allow electrical potential at said input point to increase at a known rate with time; and a means connected to said input point to establish electrical supply therethrough from said input point to said alarm device when the electrical potential at said input point rises above a predetermined level corresponding to a known time lag on said time-constant characteristic.

* * * * *